United States Patent
Deleeuw et al.

Patent Number: 5,707,568
Date of Patent: Jan. 13, 1998

[54] PREPARATION OF SUBSTANTIALLY POLYCRYSTALLINE SILICON CARBIDE FIBERS FROM METHYLPOLYSILANES

[75] Inventors: David Charles Deleeuw; Jonathan Lipowitz, both of Midland, Mich.; Paul Pu-yuan Lu, Hacienda Heights, Calif.; James Alan Rabe, Midland, Mich.

[73] Assignee: Dow Corning Corporation, Midland, Mich.

[21] Appl. No.: 456,832

[22] Filed: Dec. 18, 1989

[51] Int. Cl.$^6$ .............. C01B 31/00; C04B 35/56
[52] U.S. Cl. .............. 264/29.2; 264/345; 419/17; 501/88; 423/345; 423/347
[58] Field of Search .............. 264/29.2, 65, 305, 264/345; 423/345, 347; 419/17; 501/88

[56] References Cited

U.S. PATENT DOCUMENTS

| | | | |
|---|---|---|---|
| 3,342,712 | 9/1967 | Yajima et al. | 264/63 |
| 4,100,233 | 7/1978 | Yajima et al. | 423/345 |
| 4,152,509 | 5/1979 | Yajima et al. | 528/4 |
| 4,248,814 | 2/1981 | Yajima et al. | 264/63 |
| 4,347,347 | 8/1982 | Yajima et al. | 528/30 |
| 4,359,559 | 11/1982 | Yajima et al. | 525/475 |
| 4,550,151 | 10/1985 | Takamizawa et al. | 528/7 |
| 4,604,367 | 8/1986 | Takamizawa et al. | 501/95 |
| 4,657,991 | 4/1987 | Takamizawa et al. | 525/477 |
| 4,806,612 | 2/1989 | Chandra et al. | 501/88 |

*Primary Examiner*—Peter A. Nelson
*Attorney, Agent, or Firm*—James E. Bittell; Sharon K. Severance

[57] ABSTRACT

A process for the preparation of substantially polycrystalline silicon carbide fibers is provided. The fibers may be fabricated to have a small diameter and are thermally stable at high temperatures. The process is carried out by initially forming fibers from a preceramic polymeric precursor comprising methylpolysilane resins. The fibers are then infusibilized to render them nonmelting followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed by the process of the present invention have at least 75% crystallinity and have a density of at least about 2.9 gm/cm$^3$. The polymeric precursor or the fibers contain, or have incorporated therein, at least about 0.2% by weight boron. This incorporation of boron may be accomplished either prior to or during formation of the fibers or during at least one of the infusibilizing or pyrolyzing steps of the process.

19 Claims, 3 Drawing Sheets

PREPARATION OF SUBSTANTIALLY POLYCRYSTALLINE SILICON CARBIDE FIBERS FROM METHYLPOLYSILANES

BACKGROUND OF THE INVENTION

This invention relates to the preparation of substantially polycrystalline ceramic fibers from preceramic polymeric precursors, and more particularly to the incorporation of boron into fibers formed from methylpolysilane (MPS) resins to produce high temperature stable silicon carbide fibers.

In recent years ceramic materials have been developed for uses requiring good mechanical strength at high temperatures. Silicon carbide is one such ceramic material which possesses desirable high temperature properties. For example, fibers of silicon carbide have been used as a reinforcing material in composite materials such as fiber reinforced metals and fiber reinforced ceramics. However, the hardness and high temperature properties of silicon carbide make it difficult to fabricate and work with so that various methods of fabrication have been developed depending on the desired form of the final article to be produced.

Many different processes have been used in attempts to manufacture silicon carbide fibers. Some have used inorganic silicon carbide powders as the starting material. However, those processes are useful only for the production of relatively large diameter fibers (approximately 70 micrometers and larger). Smaller diameter fibers are more desirable because they are more flexible, can be woven, and provide better reinforcement of metal and ceramic matrix materials.

Where it is desired to produce small diameter fibers of silicon carbide, one method which has been used is to spin an organosilicon polymer into a fiber. The fiber is then infusibilized to render it nonmelting (typically by air treatment at somewhat elevated temperatures) followed by pyrolysis at high temperatures to produce a ceramic fiber.

A problem in the preparation of silicon carbide fibers by the above method is that substantial amounts of oxygen and or nitrogen may either already be present in or introduced into the fibers during spinning, infusibilization, or ceramification. The presence of this oxygen and/or nitrogen adversely affects the thermal stability of the fibers. That is, as the fibers are ceramified at high temperatures, the oxygen and/or nitrogen present in the fibers leaves the fibers, causing weight losses, porosity, and losses in tensile strength in the fibers. While lower ceramification temperatures may be used to decrease the amount of oxygen and/or nitrogen lost, exposure of such fibers to high temperatures during use results in the same problem of the oxygen and/or nitrogen present in the fibers leaving the fibers, causing weight losses, porosity, and losses in tensile strength in the fibers.

Workers have attempted to minimize the oxygen and/or nitrogen present in ceramics fabricated from organosilicon polymers by using the classes of polymers known as polycarbosilanes (PCS) or methylpolysilanes (MPS). The polymeric backbone structure of polycarbosilanes consists of only silicon and carbon and the backbone structure of methylpolysilanes consists of only silicon as opposed to polyorganosiloxanes in which the polymeric backbone structure consists of silicon and oxygen. For example, Yajima et al, U.S. Pat. No. 4,100,233, teaches a process for the production of silicon carbide fibers using polycarbosilanes as a starting material. Baney et al, U.S. Pat. Nos. 4,310,651 and 4,298,559 teach processes for the production of silicon carbide fibers using methylpolysilanes as a starting material.

Nicalon (trademark), a commercially available silicon carbide containing ceramic fiber based on a polycarbosilane starting material, is produced by the above-described process of fiber spinning, infusibilization, and then pyrolysis. However, the Nicalon fibers so produced contain significant amounts of oxygen (9–15% by weight). It is known that Nicalon's mechanical properties degrade at elevated temperatures as low as 1200° C. due to weight losses and porosity as the oxygen leaves the fibers.

Some workers have incorporated other elements into silicon carbide-based bodies derived from polycarbosilanes in an attempt to improve the mechanical properties of the bodies. Thus, elements such as boron, titanium, and zirconium have been introduced into preceramic polymers. Yajima et al, U.S. Pat. No. 4,248,814, teaches sintering a polycarbosilane and up to 15% by weight of a borosiloxane polymer to produce a ceramic.

Yajima et al, U.S. Pat. No. 4,359,559, teaches the production of a polymetallocarbosilane by mixing a polycarbosilane with a titanium or zirconium containing organometallic compound. Yajima et al, U.S. Pat. No. 4,347,347, teaches the production of a block copolymer of a polycarbosilane and a polymetallosiloxane. Yajima et al, U.S. Pat. No. 4,342,712, teaches the production of titanium, silicon, and carbon-containing ceramic fibers from a block copolymer of a polycarbosilane and a titanoxane. Yajima et al, U.S. Pat. No. 4,152,509, teaches the incorporation of boron into the backbone of a polysiloxane to form a borosiloxane polymer which is then mixed with a powdered silicon carbide and cold pressed into a molded article.

Yajima et al, U.S. Pat. Nos. 4,220,600 and 4,283,376, teach the preparation of Si—C—O containing fibers by spinning, curing, and pyrolysis of polycarbosilanes containing up to 15% by weight of a borosiloxane polymer. This is taught to provide not more than 500 ppm boron in the ceramic fiber. While pyrolysis temperatures of up to 1800° C. are disclosed, none of the examples utilize pyrolysis temperatures above 1300° C., and the preferred pyrolysis temperature range is taught to be from 1000° to 1500° C.

However, the prior art describes problems with the incorporation of these elements (sometimes termed heteroatoms) into the polymer. For example, the synthesis procedures for heteroatom incorporation involve high temperature and pressure reaction conditions. The yields of the resulting polymers are low. Also, the heteroatoms bond to the silicon atoms in the polymer backbone through intermediate oxygen linkages so that increasing amounts of oxygen are present in the polymer. Further, silicon carbide-based fibers so produced are typically composed of extremely fine crystalline grains; heating the fibers to temperatures of 1300° C. or higher causes growth of the grains which results in a decrease in mechanical strength of the fibers. See, Takamizawa et al, U.S. Pat. No. 4,604,367 at column 1.

Takamizawa et al, U.S. Pat. No. 4,604,367, teaches the preparation of an organoborosilicon polymer by mixing an organopolysilane with an organoborazine compound, spinning fibers, and then ceramifying the fibers by heating at temperatures in the range of from "900° to 1800° C.". However, the actual examples in Takamizawa show heating up to only 1500° C., and the tensile strength of the Takamizawa fibers is shown to drop off dramatically when heated to temperatures approaching 1500° C.

Takamizawa et al, U.S. Pat. No. 4,657,991, teaches the formation of ceramic precursors of silicon carbides using a polycarbosilane and an organometallic compound containing boron, aluminum, titanium, or zirconium. The patentee teaches pyrolysis of the polymer at temperatures between about 800° and 1500° C. Pyrolysis temperatures above 1500° C. are taught to decrease the mechanical strength of the resulting fibers due to grain size growth.

However, there are a number of applications for ceramic fiber materials which must be able to withstand exposure to much higher temperatures above 1500° C. while retaining their mechanical strength properties. Thus, there remains a need in the art for thermally stable, small diameter silicon carbide fibers for use in both metal and ceramic matrix composites which can withstand very high temperatures of operation.

SUMMARY OF THE INVENTION

The present invention meets that need by providing a process for the preparation of substantially polycrystalline silicon carbide fibers which can be fabricated to have a small diameter and which are thermally stable at high temperatures. The process is carried out by initially forming fibers from a preceramic polymeric precursor comprising methylpolysilane resins. The fibers are then infusibilized to render them nonmelting, followed by a pyrolysis step in which the fibers are heated to a temperature in excess of 1600° C. in a nonoxidizing atmosphere to form substantially polycrystalline silicon carbide fibers. The substantially polycrystalline silicon carbide fibers which are formed by the process of the present invention have at least 75% crystallinity, a density of at least about 2.9 gm/cm$^3$, and a very low residual oxygen and/or nitrogen content.

The polymeric precursor or the fibers contain, or have incorporated therein, at least about 0.2% by weight boron. This incorporation of boron may be accomplished either prior to or during formation of the fibers, or during at least one of the infusibilizing or pyrolysis steps of the process. For example, boron may be incorporated directly into the polymeric precursor by reacting the precursor with a boron-containing compound or by mixing the boron-containing compound with the precursor. Alternatively, boron may be incorporated into the polymeric precursor during the infusibilization step by exposing the polymeric precursor to a boron-containing gas. In yet another alternative embodiment, boron may be incorporated into the precursor fibers during the pyrolysis step by exposing the precursor fibers to a boron-containing gas. It is preferred that the boron present be substantially uniformly distributed throughout the fibers.

The polymeric fibers may be formed by any of a number of conventional fiber forming processes. For example, the fibers may be formed by spinning techniques such as melt spinning, wet spinning, or dry spinning. A preferred fiber-forming class of polymers is methylpolysilanes. The preferred class of methylpolysilanes may be alkoxy or phenoxy-substituted, or contain other substituents such as alkyl, aryl, and amines. It has been found that this class of polymers are solids at room temperatures and have softening points which render them readily formable into fibers using melt spinning techniques. Such polymers may be readily drawn into fibers having diameters of 100 micrometers or less, and preferably having diameters from about 50 micrometers down to about 10 micrometers.

The fibers are then infusibilized to render them nonmelting by curing and crosslinking them in a conventional manner. For example, the fibers may be cured in air. Alternatively, the fibers may be infusibilized by curing the fibers with gamma irradiation or ultraviolet light.

The fibers may also be infusibilized, and at the same time have boron incorporated therein, by curing the fibers first in an atmosphere containing boron trichloride followed by an atmosphere containing ammonia or an amine. The fibers may also be infusibilized by curing the fibers first in an atmosphere containing nitric oxide followed by an atmosphere containing boron trichloride or diborane.

After infusibilization, the fibers are then pyrolyzed by heating them to a temperature in excess of about 1600° C., and preferably at a temperature of about 1800°–1850° C. Temperatures in excess of about 2000° C. are not preferred as there is undesirable grain size growth of the silicon carbide which adversely affects fiber strength. The nonoxidizing atmosphere comprises a gas such as, for example, argon, helium, and mixtures thereof. The time for which the fibers are held at a particular maximum temperature will vary inversely with the temperature. The duration of the pyrolysis treatment should be sufficient to eliminate substantially all oxygen and/or nitrogen from the fibers. For example, where the fibers are heated to about 1800° C., it has been found that that temperature should be maintained for about one hour. Lower pyrolysis temperatures require correspondingly longer treatment times.

Through the controlled addition of boron to the polymer, or to the fibers at some point in the process, dense, polycrystalline silicon carbide fibers are formed which exhibit improved mechanical strengths at high operating temperatures above about 900° C. If boron is not present in the fiber during the high temperature stage (i.e., about 1300° to 1600° C.) of the pyrolysis, the fibers lose their shape and have very low strength.

Accordingly, it is an object of the present invention to provide a process for the preparation of substantially polycrystalline silicon carbide fibers which can be fabricated to have a small diameter and which are thermally stable at high temperatures. This, and other objects and advantages of the present invention, will become apparent from the following detailed description, the accompanying drawings, and the appended claims.

DETAILED DESCRIPTION OF THE PREFERRED EMBODIMENTS

Figure 1A:
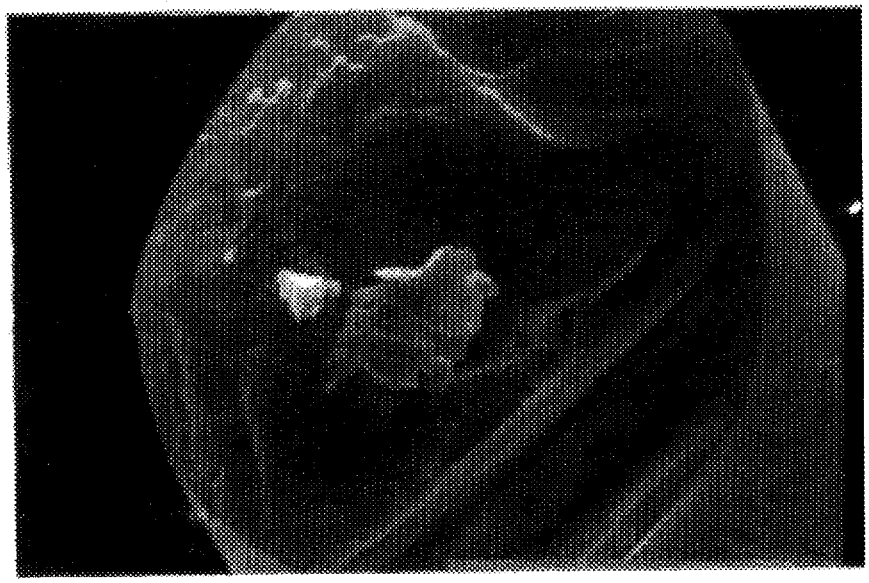
FIGS. 1a and 1b are photomicrographs taken with a scanning electron microscope of a methylpolysilane fiber produced by the process of the present invention before and after treatment at 1800° C., respectively.

The polymeric precursor compositions which are used in the practice of the present invention are selected from the class of methylpolysilane resins. Such polymers are typically solids at room temperature, can be readily spun into small diameter fibers, can be rendered infusible such that the polymer will remain in fiber form during pyrolysis, and when pyrolyzed produce a ceramic composition in which the carbon to silicon ratio is roughly 1 to 1.

Preferably, the resins are solids at room temperature. They may have softening points which render them readily extrudable for conventional fiber spinning techniques such as melt spinning, or they may be more suitable for spinning using wet or dry spinning techniques.

The methylpolysilanes may be formed into fibers by any of a number of conventional spinning techniques such as melt spinning, dry spinning, or wet spinning. After spinning, the fibers are drawn to very small diameters of about 100 micrometers, and preferably from about 50 micrometers down to about 10 micrometers. These small diameters provide ceramic fibers which are more readily woven into reinforcing matrices for composite materials.

The methylpolysilanes useful in the practice of the present invention include those taught by Baney et al, U.S. Pat. Nos. 4,310,651, 4,298,558, 4,298,559, and 4,314,956, and Baney, U.S. Pat. Nos. 4,310,481 and 4,310,482.

The polymeric precursor or the fibers contain, or have incorporated therein, at least about 0.2% by weight boron, and most preferably at least about 0.6% by weight boron. Also, it is desirable that the boron present in the fibers be substantially uniformly distributed throughout the fibers. This incorporation of boron may be accomplished either prior to or during formation of the fibers or during at least one of the infusibilizing step or the initial heating period of the pyrolysis. For example, boron may be incorporated directly into the polymeric precursor by reacting the precursor with a boron-containing compound or by mixing a boron-containing compound with the precursor. Other known reaction procedures may also be used to incorporate boron into the polymeric precursor.

Alternatively, boron may be incorporated into the polymeric precursor during the infusibilization step by exposing the polymeric precursor to a boron-containing gas. This may be accomplished at relatively low temperatures of between about room temperature to about 200° C. and below the softening point of the polymeric precursor.

The polymeric precursor fibers may be infusibilized by sequential exposure to a boron containing gas such as boron trifluoride, boron tribromide, or boron trichloride and then to an amine such as ammonia at temperatures in the range of from about 25 to about 200° C. Preferably, the both boron containing gas and amine gases are diluted with an otherwise inert gas such as argon or nitrogen. It is preferred that the boron containing gas concentration in the curing atmosphere be in the range of from about 10 to about 30% by volume, while the amine is present in the range of from about 1 to about 15% by volume.

It is preferred to heat the fibers slowly so that their softening temperature is not exceeded. However, as the cure proceeds, the softening temperature of the polymer will rise, and the curing temperature can also be increased accordingly as the cure proceeds. The cure times should be sufficient to permit the boron to diffuse into the fibers and be substantially uniformly distributed therein to the desired concentration levels. Cure times in the range of from 4 to about 24 hours have been found to be adequate. Of course, optimum curing times depend on not only the polymer treated, but also the diameter of the fibers and the concentration of boron in the curing atmosphere.

In another alternative embodiment of the invention, the polymeric precursor fibers may be cured by exposure first to an atmosphere containing nitric oxide followed by exposure to an atmosphere containing boron trichloride or diborane. Nitric oxide concentrations in the range of from about 1 to about 10% by volume in an otherwise inert gas such as argon have been found to be useful when followed sequentially by exposure of the fibers to an atmosphere containing either boron trichloride or diborane. A general description of the nitric oxide cure process is contained in U.S. Pat. No. 4,847,027, the disclosure of which is incorporated by reference.

Again, exposure of the fibers to the boron-containing atmosphere is carried out at temperatures below the softening temperatures of the fibers. It has been found that temperatures in the range of from about 25 to about 200° C. may be used. Increasing the temperature over time as the cure proceeds speeds up the curing process. Total cure times of from about 4 to about 24 hours may be used.

In yet another embodiment of the invention, boron may be incorporated into the polymeric precursor during the initial stages of the pyrolysis process, such as during the time that the fibers are being heated up to the temperature at which pyrolysis begins and the polymer composition converts to a ceramic composition. For example, incorporation of boron into the precursor polymer fibers can be effected by diffusion of a boron containing gas such as diborane into the infusibilized fibers.

Typically, pyrolysis becomes significant at about 400° C. so that as the polymer is subjected to temperatures above about 400° C., the incorporation of boron becomes increasingly difficult. Accordingly, if boron is incorporated after the infusibilizing step, it is preferred to treat the fibers with a boron containing gas at a temperature below about 400° C. for a time sufficient for the desired amount of boron containing gas to diffuse into the fibers. In this embodiment of the invention, the infusibilization stage of the process may be used for curing the polymeric precursor fibers without the need to incorporate boron into the fibers at that stage. However, it is within the scope of this invention to incorporate boron into the fibers at any or all of the stages of the process.

For those instances where a conventional cure is used to infusibilize the fibers, any of a number of processes may be utilized. For example, the fibers may be cured in air during heating. Alternatively, the fibers may be infusibilized by curing the fibers with gamma irradiation or ultraviolet light.

After infusibilization, the fibers are then pyrolyzed by heating them to a temperature in excess of about 1600° C., and preferably at a temperature of about 1800°–1850° C. It has been found that both oxygen and nitrogen are eliminated from the fibers at temperatures above about 1300° C. However, the best densification, modulus improvement, and stability when the fibers are subsequently exposed to high temperatures are achieved when the fibers are pyrolyzed at temperatures in excess of about 1600° C.

As mentioned above, boron may be incorporated into the fibers during the early stages of pyrolysis by exposing the fibers to an atmosphere containing a boron-containing gas. For example, the fibers may be exposed to an atmosphere containing diborane, or other boron hydrides such as tetraborane, pentaborane, or the like. Other boron-containing compounds such as borazine or trichloroborazine may also be used if the temperatures of the atmosphere are such that these compounds are vaporized and present in gaseous form.

Again, the concentration of the boron-containing compound in the atmosphere may be small. For example, if diborane is used, workable concentrations are in the range of from about 0.01 to about 1.0% by volume of the atmosphere. Again, inert gases such as argon or helium may be used to make up the remainder of the atmosphere. Temperatures at which significant amounts of boron are deposited and diffuse into the fibers range from about 50° to about 500° C. The times for exposure to the boron-containing gaseous atmosphere may vary based on the diameter of the fibers, the concentration of the boron-containing gas in the atmosphere, and the temperatures used. Typical exposure times are in the range of from about 1 to about 24 hours.

At pyrolysis temperatures above about 1300° C., nitrogen-containing atmospheres are not preferred as nitrogen is not inert to the fibers under those temperature conditions. At high temperatures, truly inert gaseous atmospheres are preferred such as argon and/or helium. Pyrolysis temperatures in excess of about 2000° C. are not preferred as there is undesirable grain size growth of the silicon carbide ceramic which forms which adversely affects fiber strength.

The time for which the fibers are held at a particular maximum temperature will vary inversely with the temperature. The duration of the pyrolysis treatment should be sufficient to reduce oxygen and/or nitrogen content of the fibers to below about 0.5 weight % and preferably to below about 0.2 weight % or less. Where the fibers are heated to about 1800° C., it has been found that that temperature should be maintained for about one hour. Lower pyrolysis temperatures require correspondingly longer treatment times.

Figure 1B:
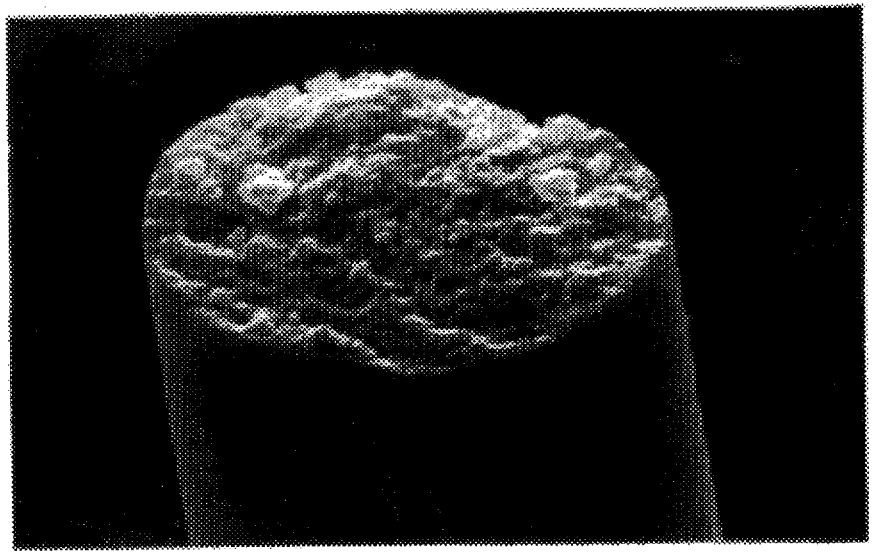
Figure 2A:
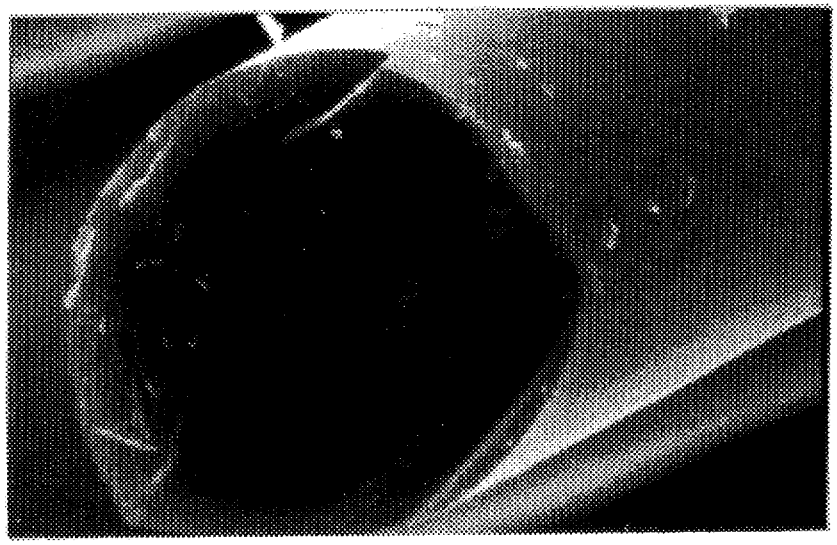
FIGS. 2a and 2b are photomicrographs taken with a scanning electron microscope of a methylpolysilane fiber produced by the process of the present invention before and after treatment at 1800° C., respectively.
Figure 2B:
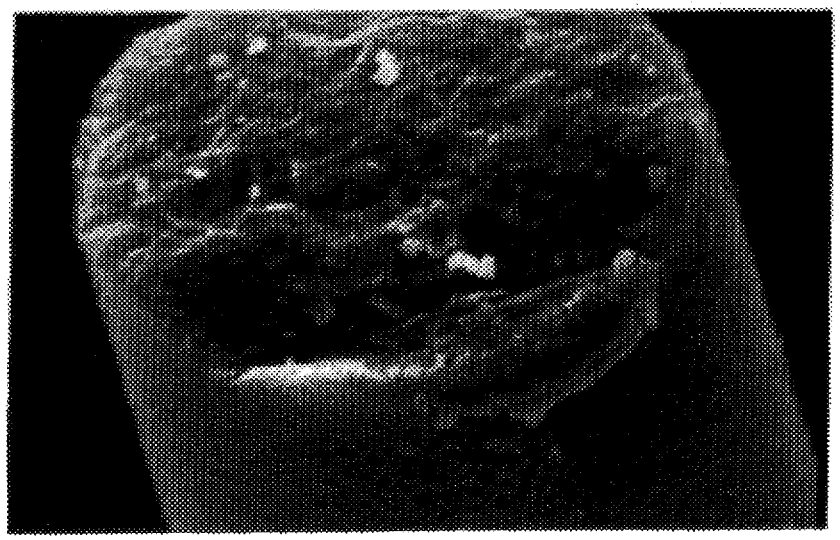

The ceramic fibers which result from the process of the present invention have at least 75% crystallinity and have a density of at least about 2.9 gm/cc, which represents about 90-95% of theoretical density. The photomicrographs of FIGS. 1b and 2b illustrates the appearance of methylpolysilane fibers after boron incorporation and pyrolysis at 1800° C. for one hour. The presence of boron distributed substantially uniformly throughout the fiber produces a dense fiber having a relatively smooth surface structure and relatively fine grain sizes.

The silicon carbide fibers produced by the practice of the process of the present invention possess extremely fine grained structures having grain sizes of less than about 0.2 micrometers (less than about 200 nanometers), and typically in the range of about 100 nanometers. Virtually all of the oxygen and/or nitrogen originally present in, or introduced into, the fibers is removed by the high temperature pyrolysis step. Less than about 0.5%, and preferably less than about 0.2%, by weight oxygen and/or nitrogen remain.

Figure 3A:
FIGS. 3a and 3b are photomicrographs taken with a scanning electron microscope of a methylpolysilane fiber produced by the same process as the fiber of FIGS. 2a and 2b, both before and after treatment at 1800° C. except that no boron was incorporated into the fiber.
Figure 3B:
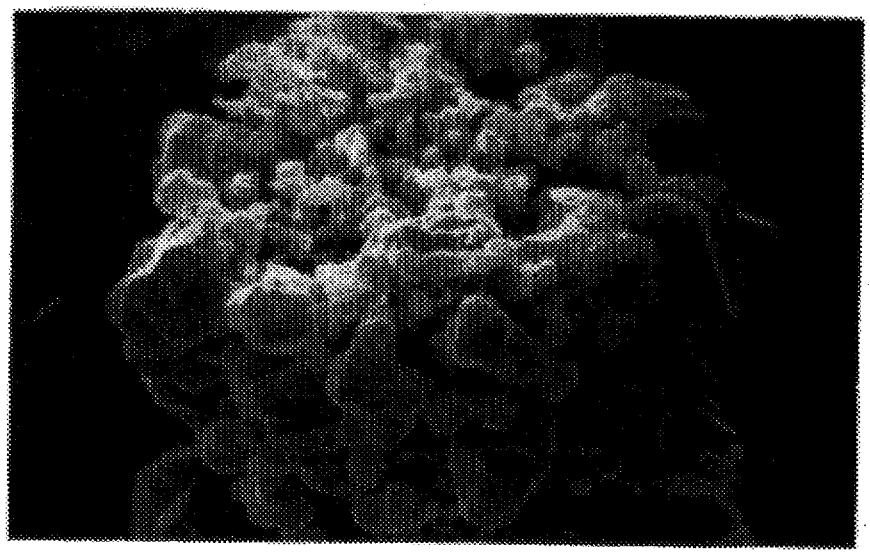

By comparison, fibers treated in a similar manner, including high temperature pyrolysis but without boron incorporation, become porous, weakened mechanically, and coarse grained as illustrated by the photomicrograph of FIG. 3b. It is believed that this porosity and weakening of mechanical strength occurs upon loss of gases containing CO, SiO, and $N_2$ (if N is present) during pyrolysis above about 1300° C. with concurrent crystallization.

In order that the invention may be more readily understood, reference is made to the following examples, which are intended to illustrate the invention, but are not to be taken as limiting the scope thereof.

EXAMPLE 1

A methylpolysilane polymer containing phenyl and octyl substituents was synthesized by reacting a mixture of methylchlorodisilanes, phenyltrichlorosilane and n-octyltrichlorosilane. Into a reaction vessel was added a mixture of 524 gm of methylchlorodisilanes, 46 gm of phenyltrichlorosilane, 6 gm of n-octyltrichlorosilane, 5 gm of tetrabutyl phosphorous chloride and 121 gm of toluene. Under an inert atmosphere, the reaction mixture was heated to 240° C. over a 3.5 hour period and volatile materials were distilled out. The pressure was gradually reduced from 1 atmosphere to 20 mm of mercury, and additional volatiles were distilled out. The polymer was filtered as a toluene solution through a 0.1 micrometer membrane filter, and solvent was distilled out at 240° C. and a pressure of 120 mm of mercury. The resulting yellow resin had a Tg of 116° C.

Analysis showed the polymer to contain:

C-33.4%; H-5.32%; Si-41.2%; Cl-15.2%, all percentages by weight.

The resin was heated to about 280° to 320° C. in a monofilament spinning unit with an orifice diameter of 0.010 inch and extruded therefrom.

The fibers formed were treated sequentially with 4 vol. % nitric oxide in argon at a starting temperature of 25° C. increasing to 140° C. over a 14 hour period followed by exposure to 0.05 vol. % diborane gas in argon at 180° C. for 4.5 hours. The infusibilized fibers were then pyrolyzed in an argon atmosphere at 1200° C. Pyrolysis was carried out in a Lindberg tubular furnace with a heating rate of 1° C. per minute from ambient temperature to 1200° C. Black, separable ceramic fibers were formed and are shown in the photomicrograph of FIG. 1a. The infusibilized fibers were then further pyrolyzed in an argon atmosphere at 1800° C. for 1 hour. Again, separable ceramic fibers were formed and are shown in the photomicrograph of FIG. 1b.

The pyrolyzed fibers were tested for tensile strength and modulus using an Instron 1122 test machine. The fibers pyrolyzed at 1200° C. were found to have a tensile strength of 107±37 Ksi (1 Ksi=1000 psi), a modulus of 11.1±6.2 Msi (1 Msi=1,000,000 psi), and a diameter of 9.2±0.7 micrometers. The fibers pyrolyzed at 1800° C. were found to have a tensile strength of 104±49 Ksi, a modulus of 38.0 Msi (no standard deviation reported), and a diameter of 6.8±0.5 micrometers. As can be seen, the mechanical strength of the fibers was not adversely affected by the pyrolysis at 1800° C.

EXAMPLE 2

The methylpolysilane resin of Example 1 was prepared and fibers melt spun as in Example 1. The fibers formed were treated sequentially with 4 vol. % nitric oxide in argon at a starting temperature of 25° C. increasing to 140° C. over a 14 hour period followed by exposure to 30 vol. % boron trichloride gas in argon at a starting temperature of 25° C. increasing to 140° C. over a 6 hour period. The infusibilized fibers were then pyrolyzed in an argon atmosphere at 1200° C. Pyrolysis was carried out in a Lindberg tubular furnace with a heating rate of 1° C. per minute from ambient temperature to 1200° C. Black, separable ceramic fibers were formed and are shown in the photomicrograph of FIG. 2a. The infusibilized fibers were then further pyrolyzed in an argon atmosphere at 1800° C. for 1 hour. Again, separable ceramic fibers were formed and are shown in the photomicrograph of FIG. 2b.

The pyrolyzed fibers were tested for tensile strength and modulus using an Instron 1122 test machine. The fibers pyrolyzed at 1200° C. were found to have a tensile strength of 130±37 Ksi, a modulus of 23.0±7.3 Msi, and a diameter of 15.2±4.5 micrometers. The fibers pyrolyzed at 1800° C. were found to have a tensile strength of 149±69 Ksi, a modulus of 28.4±5.8 Msi, and a diameter of 19.0±1.0 micrometers. As can be seen, the mechanical strength of the fibers was not adversely affected by the pyrolysis at 1800° C. As expected, the larger diameter fibers exhibited higher tensile strengths.

By comparison, the same methylpolysilane fibers exposed to nitric oxide, but with no exposure to a boron containing gas, also result in black, separable ceramic fibers after pyrolysis at 1200° C. in an argon atmosphere as shown by the photomicrograph of FIG. 3a. However, after further pyrolysis at 1800° C. in argon for 1 hour, the fibers became greenish-white and barely retained their physical integrity as shown by the photomicrograph of FIG. 3b. This demonstrates the effectiveness of boron in producing high temperature stable ceramic fibers.

EXAMPLE 3

A methylpolysilane polymer containing phenyl substituents and about 1% by weight boron was synthesized by reacting a mixture of methylchlorodisilanes, phenyltrichlorosilane, and boron tribromide. Into a reaction vessel was added 460 gm of a mixture of methylchlorodisilanes containing di-, tri-, and tetra-methyl substituted disilanes, 31.8 gm of phenyltrichlorosilane, 7.6 gm of boron tribromide, and 14.3 gm of tetrabutyl phosphorous chloride. Under an inert argon atmosphere, the reaction mixture was heated at a rate of 2° C. per minute to 250° C. Once at that temperature, the reaction was held for 1 hour under an argon purge and for two additional hours under a dynamic vacuum.

Analysis showed the resulting polymer to contain: C-34.0%; H-6.22%; Si-38.3%; Cl-15.5%; B-0.5%; and O-0.5%, all percentages by weight. The polymer was filtered as a toluene solution through a 0.2 micrometer membrane prior to spinning, and restripped at 250° C. The resulting polymer had a $T_g$ of 94° C.

The filtered polymer was pressed into a cylindrical rod and then placed in a spinning apparatus and spun at 180° C. through a 15 mil orifice. As the fibers exited the spinning apparatus, they were exposed to an ammonia-containing atmosphere. The fibers were then infusibilized by heating in an atmosphere containing ammonia to 150° C. This was followed by pyrolysis of the fibers in an argon atmosphere by heating to 1200° C. The fibers were maintained at 1200° C. for two hours and then allowed to cool under argon atmosphere to ambient temperature.

The ceramic fibers obtained had a char yield of 72% and had an analysis of 66.4% Si, 22.5% C, 3.8% O, and 1.4% B, all percentages by weight. The fibers had a tensile strength of 141±22 Ksi, a modulus of 20.2±1.5 Msi, and diameters of 11.9±1.3 micrometers. On heating to 1800° C. in argon, crystalline fibers of 70 wt % b-SiC and 11 wt % a-SiC were obtained. The fibers maintained 98.3% of their mass and generally maintained their strength after ageing at 1400° C. for 2 hours under a nitrogen atmosphere.

While certain representative embodiments and details have been shown for purposes of illustrating the invention, it will be apparent to those skilled in the art that various changes in the methods disclosed herein may be made without departing from the scope of the invention, which is defined in the appended claims.

What is claimed is:

1. A process for the preparation of substantially polycrystalline silicon carbide fibers comprising the steps of:
    a) forming fibers from a preceramic polymeric precursor comprising methylpolysilane resins;
    b) infusibilizing said fibers; and
    c) pyrolyzing said fibers at a temperature in excess of 1600° C. in a nonoxidizing atmosphere to form substantially polycrystalline silicon carbide fibers;
    said polymeric precursor or said fibers containing or having incorporated therein at least about 0.2% by weight boron either prior to step a), or during at least one of steps a), b), and c).

2. The process of claim 1 in which said substantially polycrystalline silicon carbide fibers have at least 75% crystallinity.

3. The process of claim 1 in which said substantially polycrystalline silicon carbide fibers have a density of at least about 2.9 gm/cm$^3$.

4. The process of claim 1 in which said fibers formed in step a) are formed by spinning.

5. The process of claim 4 in which said fibers formed in step a) are formed by melt spinning.

6. The process of claim 4 in which said fibers formed in step a) are formed by wet spinning.

7. The process of claim 4 in which said fibers formed in step a) are formed by dry spinning.

8. The process of claim 1 in which said fibers are infusibilized by curing said fibers in air.

9. The process of claim 1 in which said fibers are infusibilized by curing said fibers first in an atmosphere containing boron trichloride followed an atmosphere containing ammonia or amine.

10. The process of claim 1 in which said fibers are infusibilized by curing said fibers in an atmosphere containing diborane.

11. The process of claim 1 in which said fibers are infusibilized by curing said fibers with gamma irradiation.

12. The process of claim 1 in which said fibers are infusibilized by curing said fibers with ultraviolet light.

13. The process of claim 1 in which said fibers are infusibilized by exposing said fibers first in an atmosphere containing nitric oxide followed by exposing said fibers in an atmosphere containing boron trichloride or diborane.

14. The process of claim 1 in which said fibers are infusibilized by curing said fibers by heating said fibers in an atmosphere containing ammonia or an amine.

15. The process of claim 1 in which boron is incorporated into said polymeric precursor during said pyrolyzing step by exposing said polymeric precursor to a boron-containing gas.

16. The process of claim 1 in which said nonoxidizing atmosphere comprises a gas selected from the group consisting of argon, helium, and mixtures thereof.

17. The process of claim 1 in which said pyrolysis step includes heating said fibers to about 1800° C. and maintaining that temperature for about one hour.

18. The process of claim 1 in which boron is incorporated directly into said polymeric precursor by reacting said precursor with a boron-containing compound.

19. The process of claim 1 in which boron is incorporated into said polymeric precursor during said infusibilization step by exposing said polymeric precursor to a boron-containing gas.

* * * * *